United States Patent
Baumgartner

(10) Patent No.: US 7,032,721 B2
(45) Date of Patent: Apr. 25, 2006

(54) CONTROL METHOD FOR CONTROLLING A RESETTING SYSTEM OF A DISC BRAKE AND BRAKE DISC ASSEMBLY

(75) Inventor: Johann Baumgartner, Moosburg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/846,927

(22) Filed: May 17, 2004

(65) Prior Publication Data

US 2005/0040703 A1    Feb. 24, 2005

Related U.S. Application Data

(63) Continuation of application No. PCT/EP02/12741, filed on Nov. 14, 2002.

(30) Foreign Application Priority Data

Nov. 16, 2001  (DE) .................. 101 56 503

(51) Int. Cl.
F16D 66/00    (2006.01)
F16D 65/16    (2006.01)

(52) U.S. Cl. ................. 188/71.9; 188/72.8; 188/1.11 E

(58) Field of Classification Search .............. 188/18 A, 188/1.11 L, 1.11 WE, 72.4, 71.7, 71.9, 72.8
See application file for complete search history.

(56) References Cited

U.S. PATENT DOCUMENTS

| | | | |
|---|---|---|---|
| 3,498,421 A * | 3/1970 | Ohmayer | 188/370 |
| 3,534,835 A * | 10/1970 | Meier | 188/196 R |
| 6,234,587 B1 | 5/2001 | Gerum et al. | |
| 6,244,391 B1 * | 6/2001 | Bunker | 188/18 A |
| 6,293,370 B1 * | 9/2001 | McCann et al. | 188/71.8 |
| 6,394,235 B1 * | 5/2002 | Poertzgen et al. | 188/72.6 |
| 6,397,977 B1 * | 6/2002 | Ward | 188/1.11 L |
| 6,471,015 B1 * | 10/2002 | Ralea et al. | 188/1.11 L |
| 6,702,069 B1 * | 3/2004 | Ralea et al. | 188/71.5 |
| 2004/0045776 A1 * | 3/2004 | Baumgartner et al. | 188/71.7 |
| 2004/0050630 A1 * | 3/2004 | Baumgartner et al. | 188/18 A |
| 2004/0050635 A1 * | 3/2004 | Bieker et al. | 188/381 |
| 2004/0188189 A1 * | 9/2004 | Baumgartner | 188/71.7 |

FOREIGN PATENT DOCUMENTS

| | | |
|---|---|---|
| DE | 37 16 202 A1 | 11/1988 |
| DE | 197 56 519 A1 | 10/1998 |
| DE | 100 20 504 A1 | 11/2001 |
| EP | 0 610 797 A1 | 8/1994 |
| WO | WO 99/05428 | 2/1999 |

* cited by examiner

Primary Examiner—Chris Schwartz
(74) Attorney, Agent, or Firm—Crowell & Moring LLP

(57) ABSTRACT

The invention relates to a control method for controlling a resetting system of a disc brake provided with a brake caliper, involving the following steps: 1. in order to determine the actual play of the disc brake, the brake disc is displaced back and forth with the resetting devices located on each side of the brake disc between two axial stops that delimit the displacement path of the brake disc, and the covered actual displacement path is determined; 2. the actual play is calculated and adjusted based on a comparison of the actual displacement path with a pre-stored displacement path calibration value and with a set play. The invention also relates to a brake disc assembly provided with a brake disc that, when mounted on the cams of the hub, can be displaced between stops.

20 Claims, 7 Drawing Sheets

CONTROL METHOD FOR CONTROLLING A RESETTING SYSTEM OF A DISC BRAKE AND BRAKE DISC ASSEMBLY

BACKGROUND AND SUMMARY OF THE INVENTION

The invention relates to a control method for controlling an adjusting system of a disc brake having a caliper which reaches over a brake disc axially displaceable on a wheel axle, having brake pads arranged on each side of the brake disc, having an application device for the application of the disc brake, and having the electromotively designed adjusting system, which can be controlled by way of the control device. The adjusting system has at least one adjusting device, respectively, on each side of the brake disc. The adjusting device has an electric motor for adjusting the brake pads when brake pad wear occurs. The control method is implemented via a program of the control device. The invention also relates to a brake disc assembly.

Disc brakes with an electromotively operated adjusting system are known per se; thus, for example, from German Patent document DE 197 56 519 A1. A center arrangement of the adjusting drive between the rotating screws or adjusting screws is also known; for example, from German Patent document 37 16 202 A1 or International Patent document WO 99/05428.

International Patent document WO 99/05428 also describes a particularly simple control method, which can be implemented without additional sensors. For this purpose, it is suggested to carry out the release play adjustment after each braking or after a defined fixed number of brakings.

It is problematic that the known disc brakes either require a high-expenditure sensor system for measuring the release play or that a jamming of the disc brake may occur when a braking is initiated during the adjusting of the release play.

It is therefore an object of the invention to create a reliable control method for adjusting systems of disc brakes of the above-mentioned type, which permits the adjusting of the release play without the use of special sensors.

The invention solves this task by providing a control method for controlling an adjusting system of a disc brake having a caliper which reaches over a brake disc axially displaceable on a wheel axle, having brake pads arranged on each side of the brake disc, having an application device for the application of the disc brake, and having the electromotively designed adjusting system which can be controlled by way of the control device, which adjusting system has at least one adjusting device, respectively, on each side of the brake disc. The adjusting device has an electric motor for adjusting the brake pads when brake pad wear occurs. The control method is implemented via a program of the control device, wherein for determining the actual release play of the disc brake, the brake disc with the adjusting devices on each side of the brake disc, is slid back and forth between two axial stops which delimit the displacement path of the brake disc, and the actual displacement path covered in the process is determined, and the actual release play is calculated from that of the actual displacement path, a prestored displacement path calibration value and a desired release play, and is adjusted when a deviation from the desired release play is present or when a limit value is exceeded.

For determining the actual release play of the disc brake, the brake disc with the adjusting devices on each side of the brake disc, is slid back and forth between two axial stops which delimit the displacement path of the brake disc. Then, the covered actual displacement path of the brake disc is determined and the actual release play is calculated from that of the actual displacement path, a pre-stored displacement path calibration value and a pre-stored desired release play and is adjusted to the value of the desired release play when a deviation from the desired release play is present or when a limit value is exceeded.

Thus, for example, when the brake disc is slid back and forth, the electric motor of one adjusting device is first controlled for rotating the adjusting screws in the "enlarge release play direction", and the electric motor of the adjusting device situated on the respective other side of the brake disc is simultaneously controlled for rotating the adjusting screws in the "reduce release play direction". After the stop has been reached, the moving direction of the two adjusting devices is reversed until the second stop has been reached. Thus, the brake disc is slid back and forth by the two adjusting devices on each side of the brake disc between two axial stops on the hub, which delimit the displacement path. The amount of the displacement path of the brake disc, which is obtained as the difference of the distance between the two stops and the thickness of the brake disc in this area, can be stored in a memory of the electronic control system.

It is an advantage of this method that the actual release play can be determined without additional sensors.

Another special advantage is a result of the fact that no jamming of the disc brake can take place when brakings are initiated during the measuring operation of the actual release play because the brake disc is in each case moved only from one side of the brake disc, so that, also when the brake pads rest against the brake disc during the measuring, a play is still maintained on the respective opposite side of the brake pad.

When the brake disc is displaced by the wear adjusting devices on each side of the brake disc, for example, by using a decoding device of the EC motors, the actually required displacement path is determined. The actually required displacement path is greater by the amount of the release play than the distance difference stored in the control system because, when the moving direction is reversed, the adjusting device first moves through the existing release play before the brake pad moving ahead of the brake disc up to this moment touches the brake disc. During the measuring operation, the existing release play is always maintained because both adjusting devices are always moved by the same amounts in the same direction.

Preferably, the control device computes the adjusting movements of the brake pads on each side of the brake disc from the determined actual release play and controls the adjusting devices on each side of the brake disc for implementing the adjusting movements for compensating the release play.

It is advantageously possible to determine from sensed changes of the voltage characteristic and/or current characteristic and/or a decoding signal of the electric motors that one of the stops was reached during the displacing of the brake disc.

Expediently, the displacement path calibration value is determined from the difference between the distance of the two stops on each side of the brake disc and the thickness of the brake disc and is stored in a memory as a reference value. Thus, for determining the displacement path calibration value in a simple manner,—by applying both brake pads to the brake disc—the release play can be adjusted to zero; and in this condition, by sliding the brake disc back and forth between the two stops, a measuring of the actual displacement path can be implemented. The distance difference thereby determined without the release play can be stored as a reference value for subsequent release play adjusting operations.

Preferably, the displacement path calibration value is determined after the start of the operation of the vehicle and/or a brake pad and/or brake disc change, expediently on a test stand. However, the distance difference between the two end stops and the thickness of the brake disc in the area of the stops can also be stored in the electronic control system as a fixed value, specifically since, in the area of the stops, the brake disc is subjected to virtually no wear. Preferably, the value is determined by the adjusting system itself when the vehicle is operated for the first time and is preferably regularly updated during the operation of the vehicle; for example, after a start or before the switching-off of the engine. As a result, constructional tolerances as well as operationally caused changes of the distance measurements can be excluded as an error source.

Since the release play measuring operation can be implemented only when the brake is not operated, the measuring operation may also be carried out successively at the different brakes of the vehicle, in which case, during the measuring on each brake, the respective other brakes of the vehicle can also be braked, for example, by means of an EBS system.

Expediently, the axial stops are arranged on the wheel hub in order to further reduce the danger of a jamming in case another braking is initiated during the adjusting of the release play.

According to a variant of the invention, which can also be considered independently, the problem of a constructively simple implementation of the displaceability of the brake disc on the wheel hub is solved.

For this purpose, a brake disc arrangement is created which has a brake disc arranged on a wheel hub, on the outer circumference of the wheel hub cams are distributed. Supporting elements distributed along the inner circumference of the brake disc each reach between these cams. The brake disc, in the mounted condition, is displaceable on the cams of the hub between stops.

The brake disc provided between the supporting elements with one inner extension respectively having a width A is preferably secured in an axial direction by one collar, respectively, which forms one of the two stops.

Expediently, in one of the other axial directions, the brake disc is also secured by securing elements which are arranged at/on the cams of the hub.

The distance between the collars and the securing elements is preferably greater than the width A of the brake disc in the supporting area on the cams of the hub, so that a displacement path is implemented which is greater than zero.

Additional advantageous embodiments of the invention are described and claimed herein.

BRIEF DESCRIPTION OF THE DRAWINGS

In the following, preferred embodiments are described in detail by means of the drawings.

FIG. 5a is a sectional view of a brake disc on a wheel hub;

FIG. 5b is a view rotated by 90° with respect to FIG. 5a of a part of the arrangement of FIG. 5a;

DETAILED DESCRIPTION OF THE DRAWINGS

Figure 3:
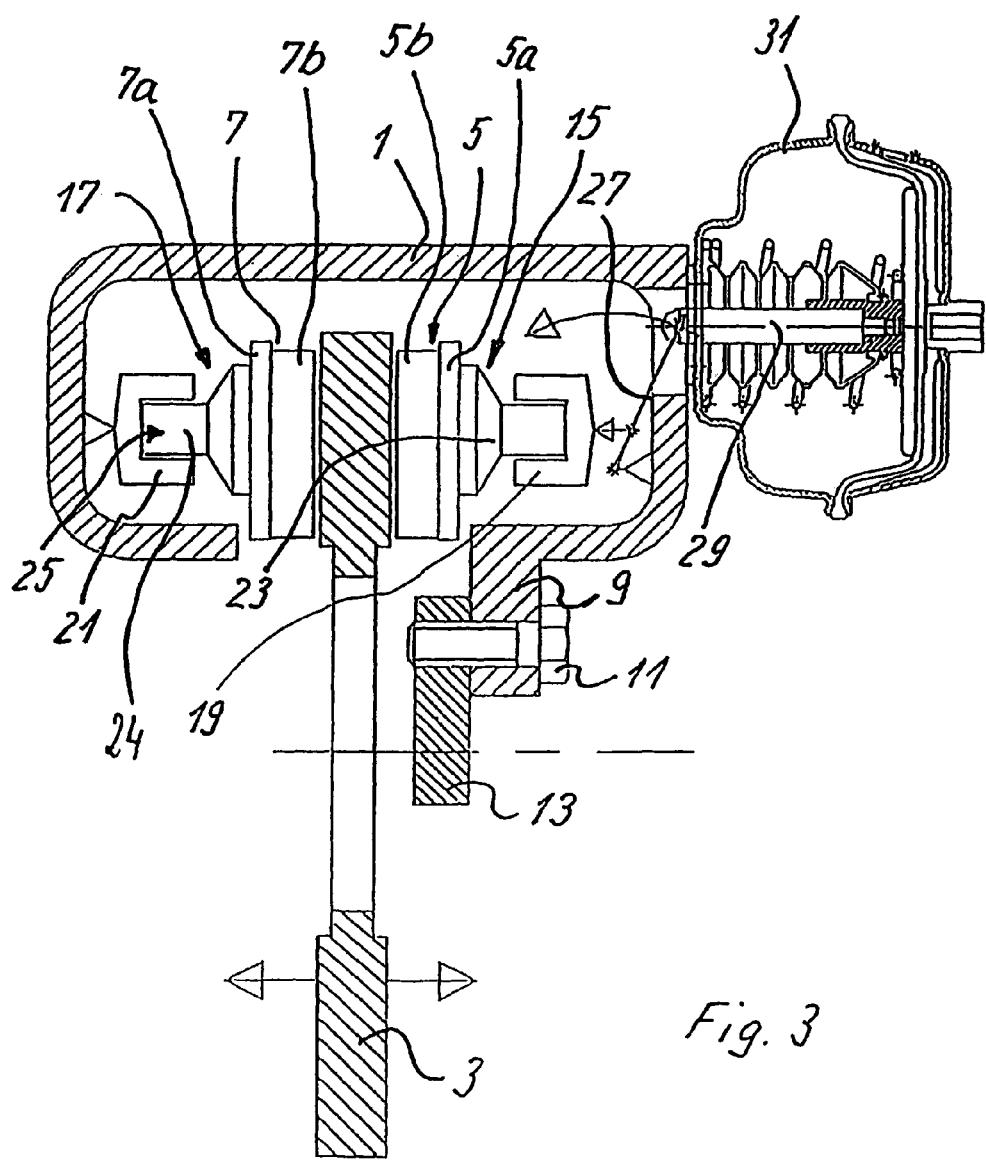
FIG. 3 is a basic diagram of a disc brake in which the method according to FIGS. 1 and 2 can be used.

FIG. 3 is a view of a pneumatically operable disc brake having a caliper 1 which straddles a brake disc 3 in an upper circumferential area of the brake disc. An operation which is completely electromotive is, however, also contemplated, but not shown.

Brake pads 5, 7 are arranged on each side of the brake disc 3, which brake pads are displaceable in the direction toward the brake disc, as well as away from it, i.e., perpendicular to the plane of the brake disc 3. The brake pads 5, 7 consist in a conventional manner of a brake pad carrier 5a, 7a and of a pad material 5b, 7b applied thereto.

In FIG. 3, in the right lower section 9 extending in the direction of the wheel axle (not shown here), the caliper 1 is fastened by at least one, or preferably several, bolts 11, for example, on an axle flange 13 of the disc brake.

Figure 5:
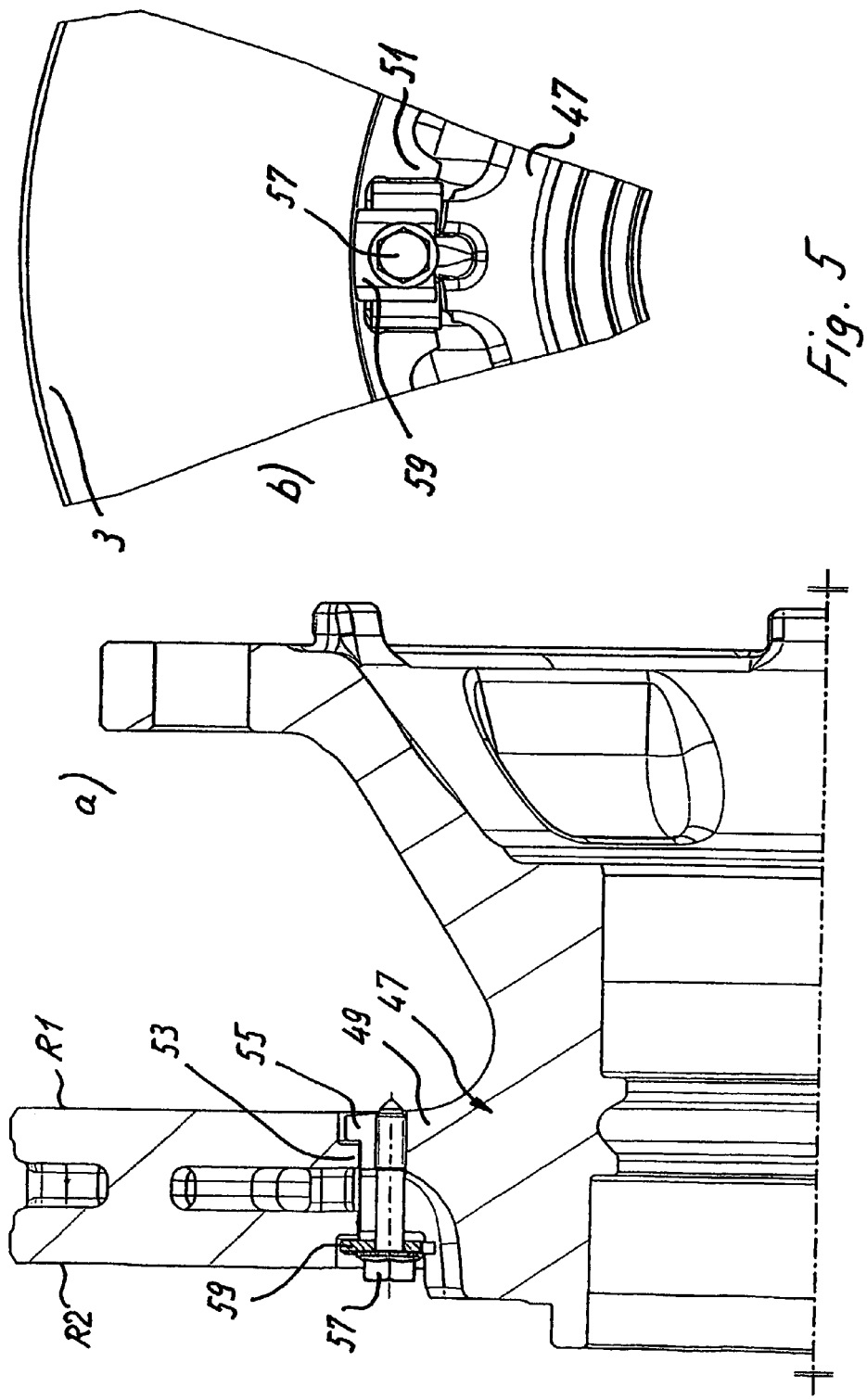
Figure 6:
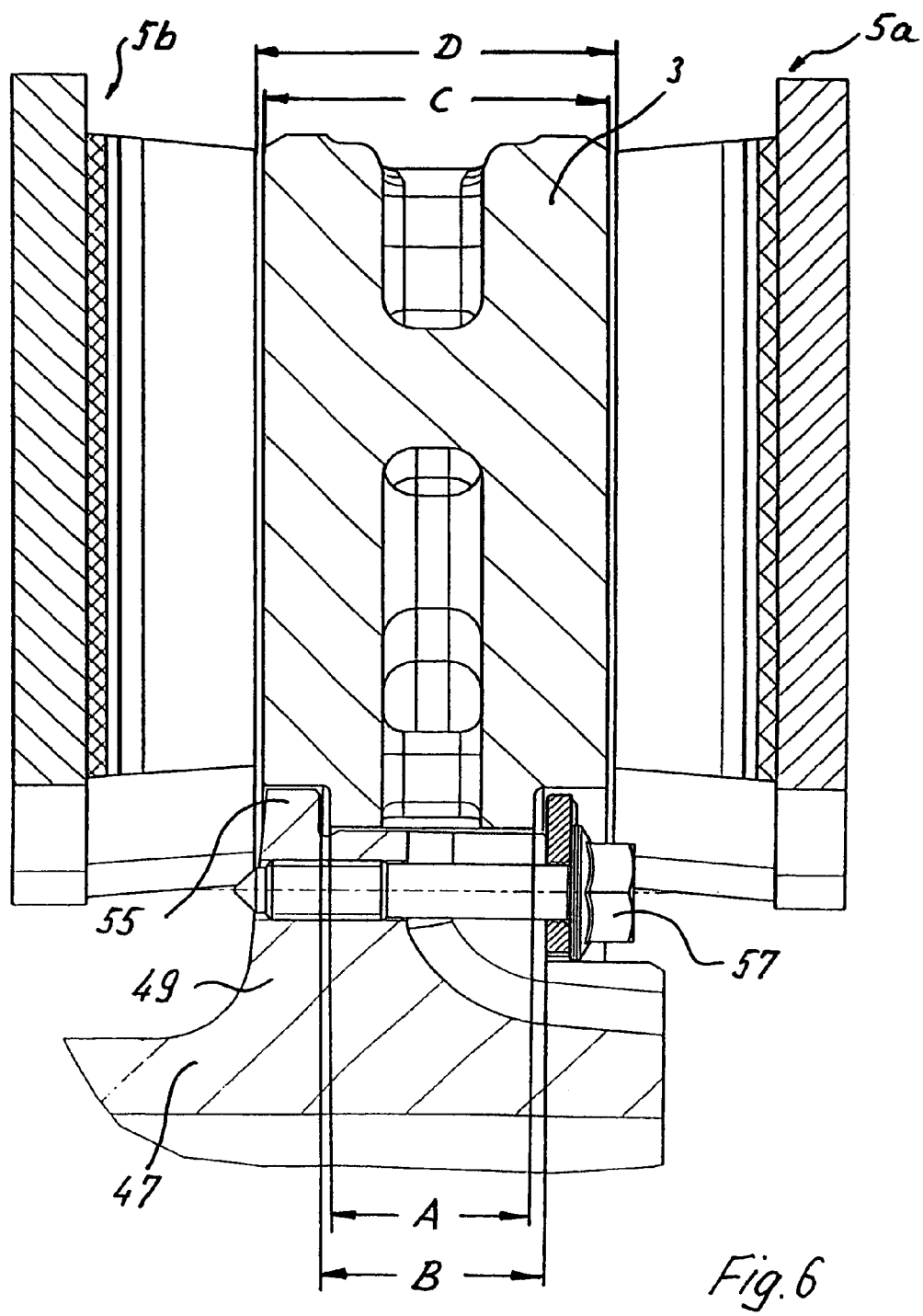
FIG. 6 is a sectional view of a brake disc on a wheel hub.
Figure 7:
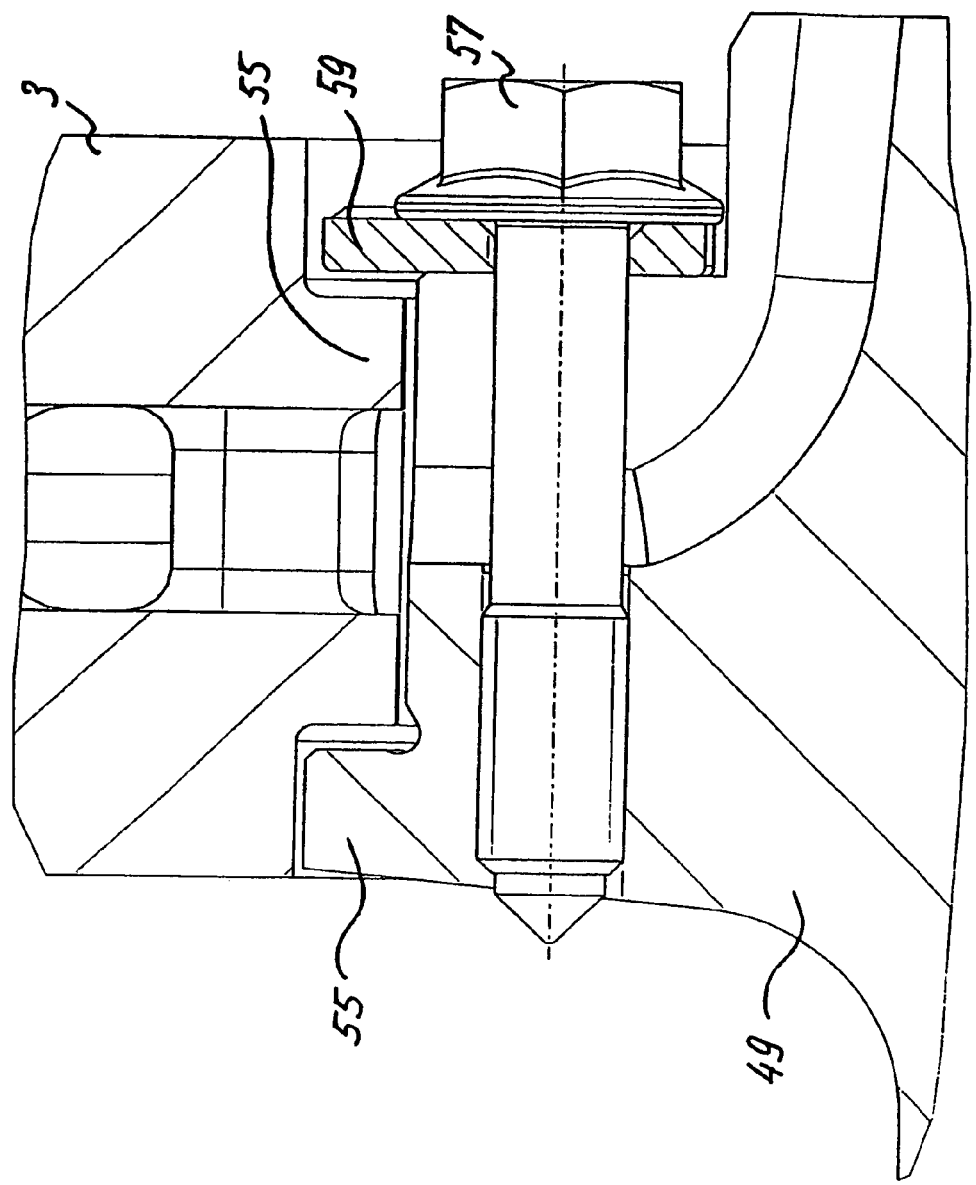
FIG. 7 is an enlarged sectional view of FIG. 6.

The brake disc 3 is constructed as a sliding disc, which can be displaced by the amount of the working stroke to be overcome during brakings relative to the caliper 1 between two stops (not illustrated in FIG. 3) on the wheel axle (see FIGS. 5 to 7 in this respect).

Since a relative mobility between the caliper 1 and the brake disc exists according to FIG. 3, which essentially corresponds to the amount of the working stroke, an adjusting system is provided. The latter comprises adjusting devices 15, 17 on both sides of the brake disc for compensating the release play or the brake pad wear occurring during brakings.

On each side of the brake disc, the adjusting devices 15, 17 consist here, for example, of at least one or more, preferably two, adjusting sleeves 19, 21, in which spindle-type extensions 24 of pressure pieces 23, 25 are rotatably arranged, so that a relative mobility exists between the adjusting sleeves 21, 23 as well as the pressure pieces 23, 25. Naturally, a reversible arrangement is also contemplated, in which the pressure pieces have a sleeve-type extension—not shown here—which can be rotated on a spindle.

The adjusting device 15 illustrated on the right in FIG. 3 is supported on a rotary lever 27 which, in addition to the adjusting device 15, is part of the brake application system. In its area, which is at the top in FIG. 13, this rotary lever 27 can be operated by a piston rod 29 of a brake cylinder 31 and, in its lower part, this rotary lever 27 is disposed on the caliper, for example, by way of ball bearings (not shown here) or another bearing, in which case, in addition, at its side facing away from the caliper, it is disposed directly on the adjusting sleeve 19 or by way of intermediate elements, such as bearings and/or additional transition pieces.

In contrast, the adjusting sleeve 21 arranged on the side of the brake disc 1 situated opposite the rotary lever 27 is supported directly on the caliper interior.

In the case of the brake of FIG. 3, two of the adjusting sleeves 19, 21 (see also FIG. 4) as well as two of the pressure pieces 23, 25 are arranged on each side of the brake disc and can be mutually synchronized by way of a gear mechanism.

Figure 4:
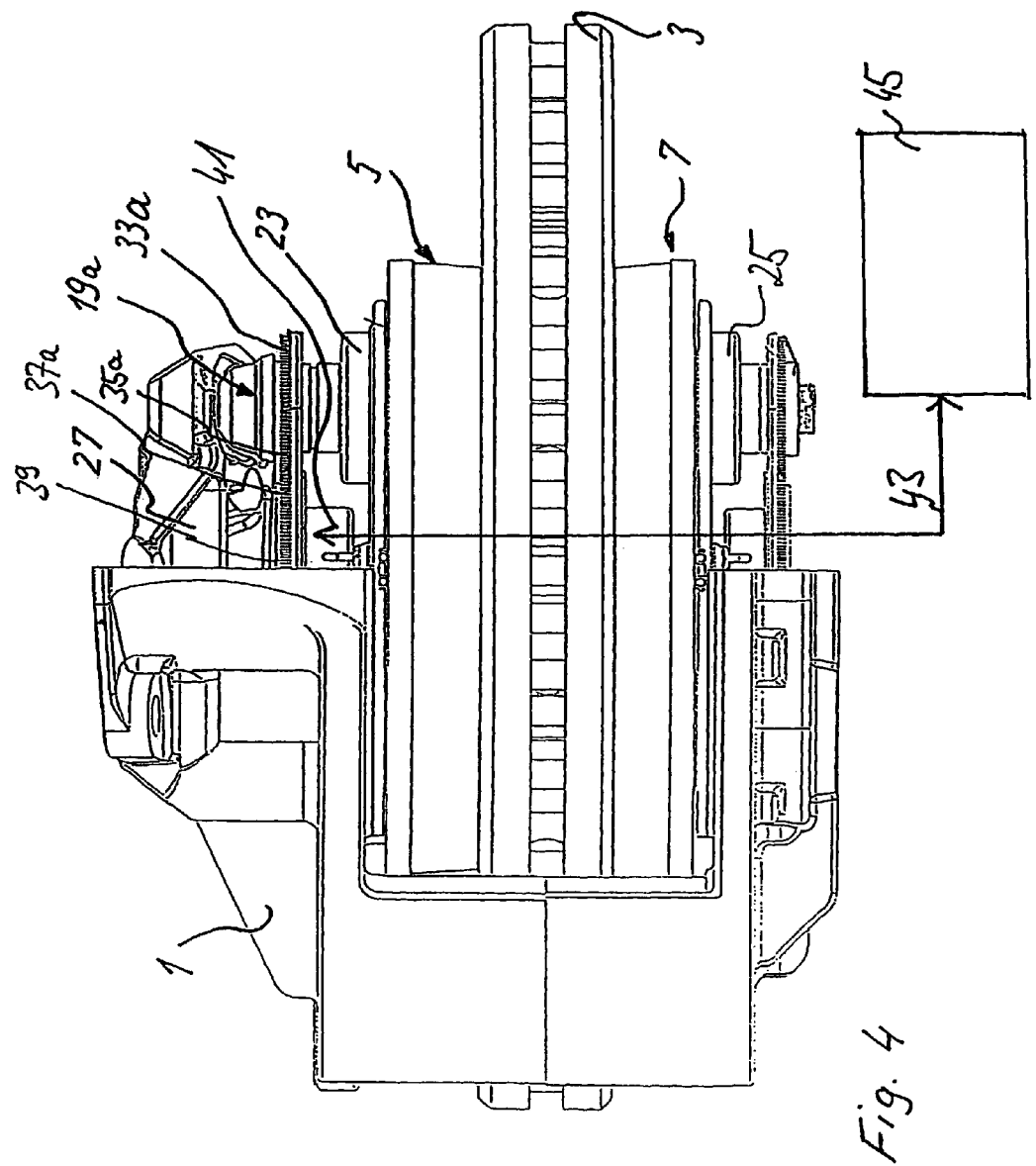
FIG. 4 is a partially sectional top view of a disc brake in which the method according to FIGS. 1 and 2 can be used.

This is also particularly easily visible in FIG. 4. On their outer circumference, the adjusting sleeves 19a illustrated here are equipped with a gear 33a (or a gear-type extension) which meshes with a gear 35a, which, in turn, is driven by a gear 37*a* which, it turn, is rotated by an output gear 39 of an electric motor 41. All gears 33*a,* 35*a,* 37*a,* 39 are situated in a plane.

FIG. 4 also schematically outlines that the electric motor 41 is connected by way of a data and supply line 43 with a control device 45 (for example, an ABS and/or EBS control device) which, in turn, may be connected with the remaining vehicle electronic system.

Figure 1:
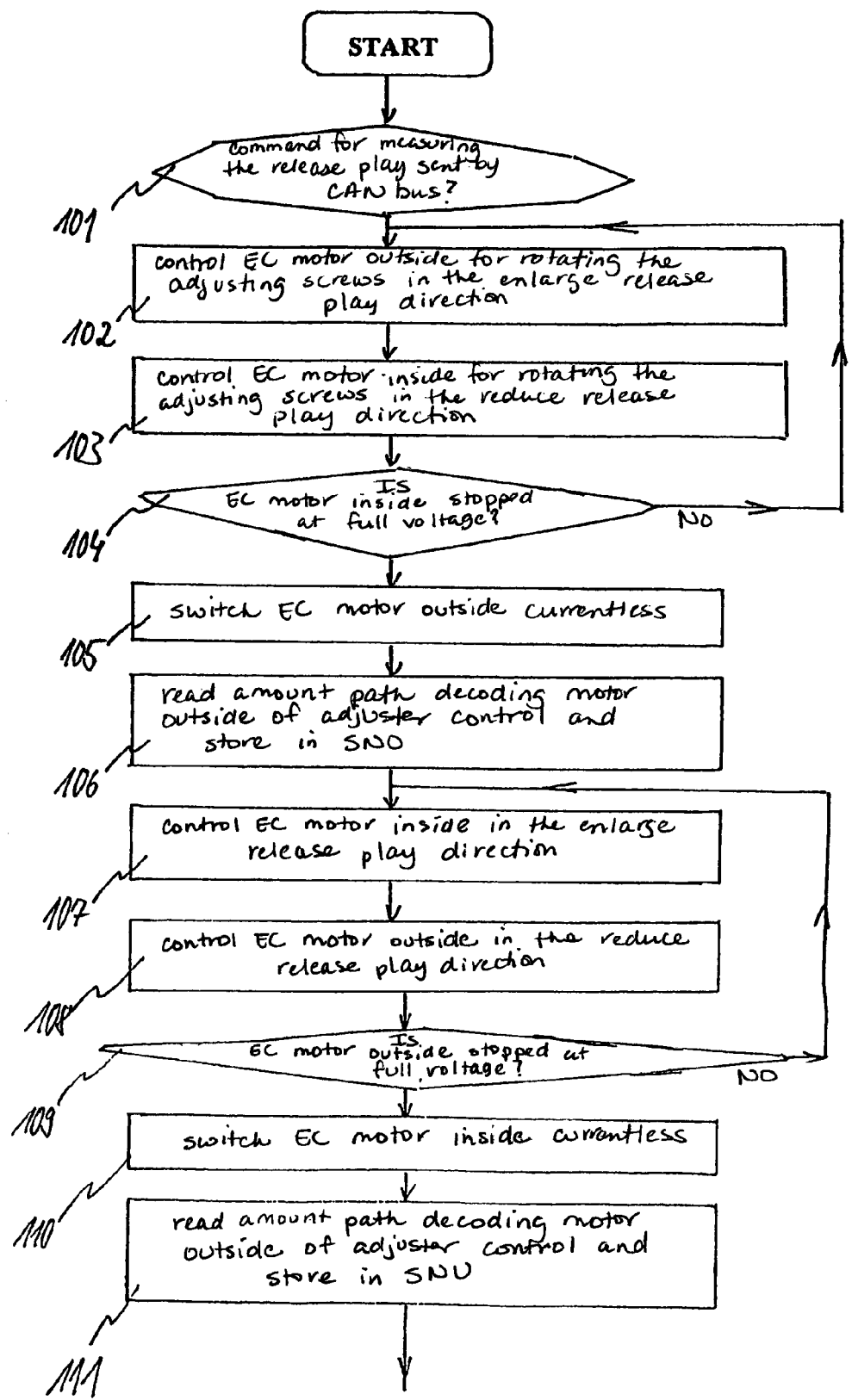
FIG. 1 is a flow chart which illustrates the sequence of an embodiment of the control method according to the invention.
Figure 2:
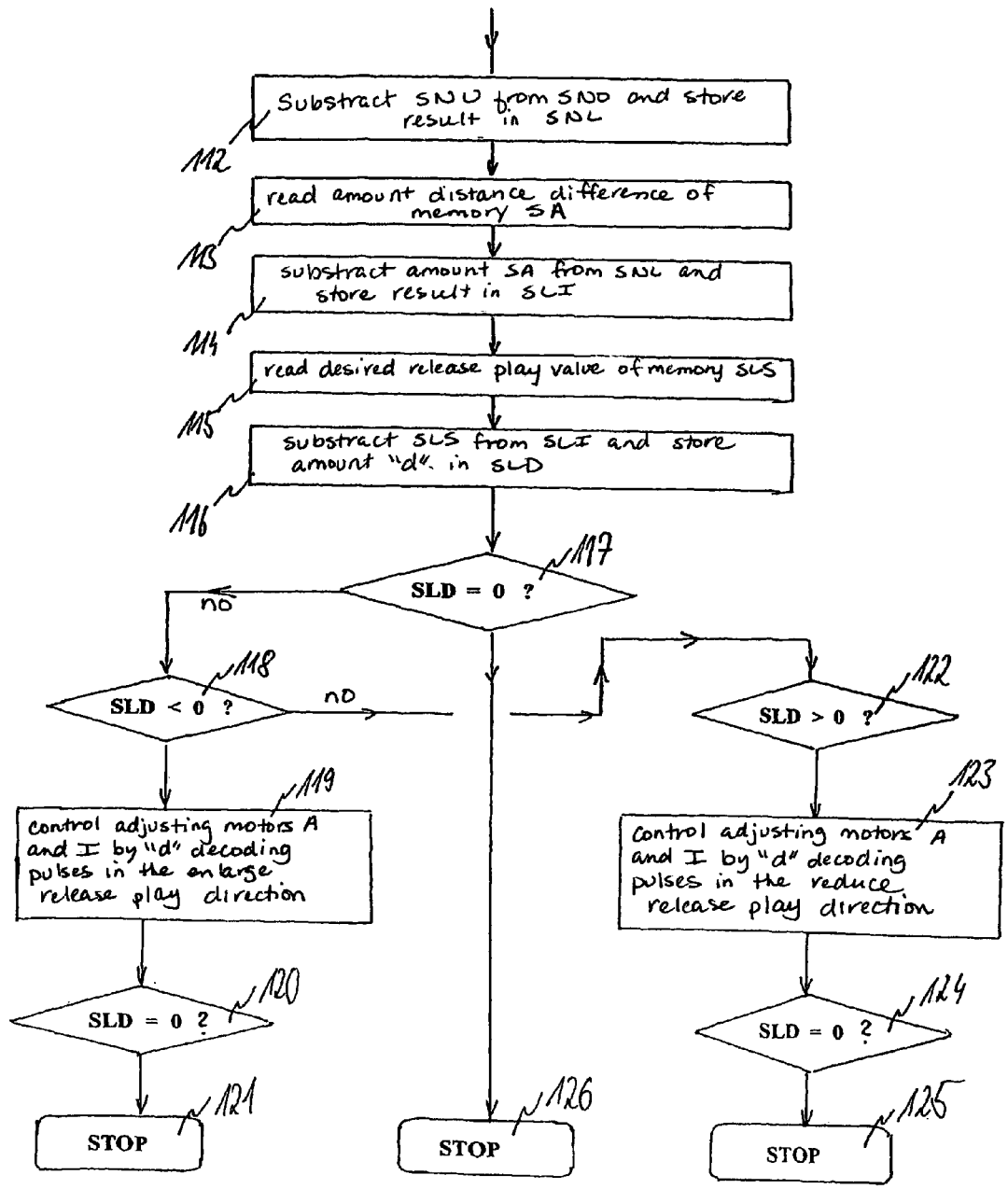
FIG. 2 is a continuation of the flow chart from FIG. 1.

FIG. 1 shows a control method for electric wear adjusting systems, which is suitable particularly for brakes of the type of FIGS. 3 and 4.

FIG. 1 illustrates a particularly uncomplicated and simple control method for adjusting the release play.

First, it is checked in a Step 101 whether a command is present for measuring the release play, such as a signal on a CAN bus. Preferably, such a command takes place after each braking, for example, when the releasing of the brake has been concluded or after a number of brakings defined by the control device.

Then, the brake disc is slid back and forth.

In this case, first, the brake disc is displaced from the "outside" toward the "inside"; that is, the electric motor of the caliper's outer adjusting device is controlled for the rotation of the adjusting screws in the "enlarge release play" direction (Step 102), and the electric motor of the caliper's inner adjusting device is preferably simultaneously controlled for rotating the adjusting screws in the "reduce release play" direction (Step 103). As a result, the brake disc is displaced by the electric motor by way of the pressure pieces in the direction of the inner stop.

Then, it is checked in Step 105 whether the stop has been reached. This can, for example, take place in that the voltage and/or current characteristic of the electric motors is observed (for example, by means of its decoding signal), which changes when the electric motor of the inner adjusting device cannot continue to rotate when the stop is reached.

If this is not so, Step 102 is started again (program loop). In contrast, if the stop has been reached, the outer electric motor is also switched currentless (Step 105) and then the covered path is determined—for example, by way of the information of the decoding signals transmitted to the step motors of the outer electric motor (Step 106)—and is stored in an SNO field.

Then, the brake disc is slid to the stop on the opposite side of the brake disc.

In this case, the brake disc is displaced from the "inside" to the "outside"; that is, the electric motor of the caliper's inner adjusting device is controlled for the rotation of the adjusting screws in the "enlarge release play" direction (Step 107), and the electric motor of the caliper's outer adjusting device is preferably controlled simultaneously for the rotation of the adjusting screws in the direction "reduce release play" (Step 108). The brake disc is thereby displaced in the direction of the outer stop.

Then, it is checked in Step 109 whether the stop has been reached. This can take place, for example, in that the voltage and/or current characteristic of the electric motors is observed, which changes when the electric motor of the outer adjusting device cannot continue to rotate when the stop has been reached.

If this is not so, Step 107 is started again (program loop).

However, if this is so, the inner electric motor is switched currentless (Step 110) and then the covered path is determined—for example, by way of the information of the decoding signals transmitted to the step motors of the outer electric motor (Step 111). This value is stored in an SNU field.

Then, the "SNU" value is subtracted from the "SNO" value and the result is stored in an SNL field (Step 112). The value of the SNL field corresponds to the covered displacement path.

Subsequently, the prestored distance difference between the stops—the displacement path calibration value—is read out of a memory area SA (Step 113). Then, between the stops, the value SA is subtracted from the value "SNI" and is stored as an actual release play information in a field SLI (Step 114).

Then, the prestored desired release play is read out of a memory area SLS (Step 115), and the actual release play SLI is subtracted from the displacement path and the occurred release play deviation is stored as the adjusting path in a field SLD (Step 116).

Then, the brake disc is possibly still moved into a desired position if it is not yet situated there—for example, at the inner stop—and then the release play is set.

In this case, there are three options.

If it is determined that SLD=0 (Step 117), the adjusting movement to be carried out is also equal to zero; that is, the desired release play is already adjusted, and no adjusting movement is required. The program is stopped (Step 126).

If SLD, however, is smaller than zero (Step 118), the adjusting motors A and I are each controlled by "d" decoding pulses in order to enlarge the release play (Step 120). If the "d" decoding pulses were covered, SLD is equal to zero (Step 120); that is, the adjustment of the release play has been concluded. If the "d" decoding pulses were reached or covered, SLD is now equal to zero (Step 124); that is, the adjustment of the release play has been concluded. The program is stopped (Step 121).

If, however, SLD is greater than zero (Step 122), the adjusting motors A and I are each controlled by "d" decoding pulses in order to enlarge the release play (Step 123). If the "d" decoding pulses were covered, SLD is equal to zero (Step 124); that is, the adjusting of the release play is concluded. The program is stopped (125).

A particularly advantageous brake disc arrangement on the wheel hub is illustrated in FIGS. 5 to 7.

On the outer circumference of the wheel hub 47, cams are distributed. Supporting elements 51 distributed in each case along the inner circumference of the brake disc 3 reach between the cams 49.

In one of the two axial directions (in FIG. 5, toward the right), the brake disc 3 equipped between the supporting elements 51 with in each case one inner extension 53 having a width A (see FIG. 6) is secured on preferably each cam 49 by one collar 55, respectively. Preferably, in each case, one of collars 55 is constructed on the outer circumference of each cam 49 (here: molded on). The width A of the extensions 53 is less than the brake disc thickness C (see FIG. 6) in the area of the friction surfaces R1 and R2.

In the opposite axial direction, the securing in each case takes place by means of securing elements 59 fastened on the cams 55 by one screw 57 respectively, which securing elements 59 may be constructed as U-shaped or L-shaped elements, whose base legs implement the axial securing and whose longitudinal legs reach between the cams 49 and the supporting elements 51.

It is important that the distance B between the collars 55 and the securing elements 59 is larger than the width A of the brake disc extension 53, so that the brake disc 3 is axially displaceable on the hub 47 (or here on the cams 55 of the hub 47) by a path B−A>0. Thus, in a simple manner, the collars 55 and the securing elements 59 represent the two stops here for limiting the displacement path of the brake disc. The path "B–A" should, preferably, correspond to the size of the working stroke of the disc brake.

The letter C indicates the thickness of the brake disc in FIG. 6, and D indicates the distance between frictional surfaces of the brake pads 5a and 5b, so that the difference D–C indicates the release play.

TABLE OF REFERENCE NUMBERS caliper 1
brake disc 3
brake pad 5
brake pad support 5a/5b
brake pad 7
brake pad support 7a/7b
section 9
bolt 11
axle flange 13
adjusting device 15
adjusting device 17
adjusting sleeve 19
adjusting sleeve 19
adjusting sleeve 21
pressure piece 23
extension 24
pressure piece 25
rotary lever 27
piston rod 29
gear/extension 33
gear 35
gear 37
gear 39
electric motor 41
data and supply line 43
control unit 45
wheelhub 47
cam 49
supporting elements 51
extension 53
collar 55
screw 57
securing elements 59
program steps 101–103
frictional surfaces R1, R2

The invention claimed is:

1. A control method for an adjusting system of a disc brake, the disc brake including a caliper that straddles an axially displaceable brake disc arranged on a wheel axle, brake pads arranged on each side of the brake disc, a brake application device for applying the disc brake, an electromotively designed adjusting system controllable via a control unit, the adjusting system having at least one adjusting device arranged on each side of the brake disc, each adjusting device being coupled with an electric motor for adjusting the brake pads as wear occurs, the control method comprising the acts of:

for determining an actual release play of the disc brake, sliding the brake disc back and forth between two axial stops delimiting a displacement path of the brake disc using the adjusting devices, wherein an actual displacement path covered is determined;

calculating the actual release play from the actual displacement path, a prestored displacement path calibration value, and a desired release play; and adjusting the actual release play when a deviation from the desired release play is present or when a limit value is exceeded.

2. The control method according to claim 1, wherein, for determining the displacement path calibration value, the method comprises the acts of:

applying both brake pads to the brake disc in order to adjust the release play to zero;

in this zero condition, sliding the brake disc back and forth between the two stops in order to measure the displacement path; and storing a distance difference thereby determined without the release play as a reference value for subsequent release play adjusting operations.

3. The control method according to claim 2, wherein the displacement path calibration value is determined after the start of the operation of the vehicle andlor a change of a brake pad andlor of the brake disc.

4. The control method according to claim 2, wherein the displacement path calibration value is determined on a test stand.

5. The control method according to claim 2, wherein the displacement path calibration value is determined after a start or before a switching-off of the vehicle.

6. The control method according to claim 1, wherein:

when the brake disc is slid back and forth, the electric motor of one adjusting device is first controlled for rotating the adjusting screws in the "enlarge release play direction", and the electric motor of the adjusting device situated on the respective other side of the brake disc is simultaneously controlled for rotating the adjusting screws in the "reduce release play direction"; and after the stop has been reached, the moving direction of the two adjusting devices is reversed until the second stop has been reached.

7. The control method according to claim 6, wherein, during the sliding back and forth of the brake disc, the two adjusting devices are always moved by the same amount in the same direction.

8. The control method according to claim 6, wherein, via sensed changes of at least one of a voltage characteristic, a current characteristic, and a decoding signal of the electric motors, it is determined that one of the stops has been reached during the displacement of the brake disc.

9. The control method according to claim 1, wherein, during the sliding back and forth of the brake disc, the two adjusting devices are always moved by the same amount in the same direction.

10. The control method according to claim 9, wherein, via sensed changes of at least one of a voltage characteristic, a current characteristic, and a decoding signal of the electric motors, it is determined that one of the stops has been reached during the displacement of the brake disc.

11. The control method according to claim 1, wherein the control unit performs the acts of:

computing adjusting movements of the brake pads on each side of the brake disc from the determined actual release play, and controlling the adjusting device on each side of the brake disc for implementing adjustment movements to compensate the release play.

12. The control method according to claim 1, wherein, via sensed changes of at least one of a voltage characteristic, a current characteristic, and a decoding signal of the electric motors, it is determined that one of the stops has been reached during the displacement of the brake disc.

13. The control method according to claim 1, wherein the actual displacement path is determined by use of a decoding device of EC motors.

14. The control method according to claim 1, wherein the displacement path calibration value is determined from a difference between the distance of the two stops on each side of the brake disc and a thickness of the brake disc, and is stored as a reference value in a memory.

15. The control method according to claim 1, wherein the displacement path calibration value is determined after the start of the operation of the vehicle andlor a change of a brake pad andlor of the brake disc.

16. The control method according to claim 1, wherein the displacement path calibration value is determined on a test stand.

17. The control method according to claim 1, wherein the displacement path calibration value is determined after a start or before a switching-off of the vehicle.

18. The control method according to claim 1, wherein the displacement path calibration value is determined successively at different brakes of the vehicle, further wherein during a measuring at each brake, the respective other brakes of the vehicle are used for braking.

19. The control method according to claim 1, wherein the axial stops are arranged on the wheel hub.

20. A method of operating a disc brake in order to determine an actual play of the disc brake, the method comprising the acts of:

displacing a brake disc of the disc brake back and forth between two axial stops delimiting a displacement path of the brake disc using at least one adjusting device arranged on each side of the brake disc in order to determine an actual displacement path;

calculating and adjusting the actual play of the disc brake based on a comparison of the actual displacement path covered with a pre-stored displacement path calibration value and with a set play.

* * * * *